Patented Dec. 27, 1949

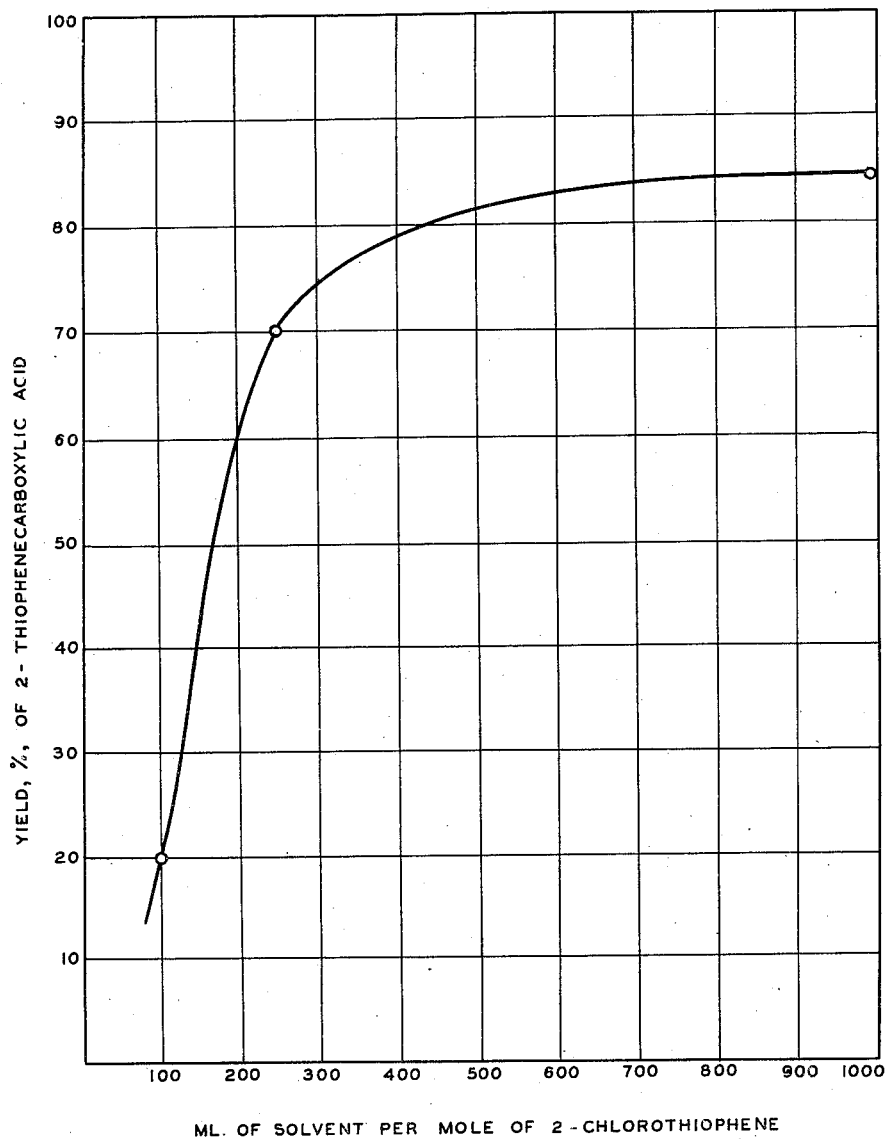

2,492,660

UNITED STATES PATENT OFFICE 2,492,660

PRODUCTION OF THIENYLSODIUM COMPOUNDS

John W. Schick, Camden, N. J., assignor to Socony-Vacuum Oil Company, Incorporated, a corporation of New York Application November 14, 1946, Serial No. 709,868

17 Claims. (Cl. 260—329)

This invention relates to a process for preparing thienylsodium compounds and, more particularly, is directed to a method for synthesizing thienylsodium.

It has heretofore been known that thienylsodium can be prepared by the action of thiophene with organomercury compounds and sodium. Such methods, however, have been unsatisfactory, resulting in small yields of thienylsodium despite the relatively high reaction temperatures employed and the excessively long reaction periods of the order of one day or more. These methods, moreover, require the previous preparation of expensive organomercury compounds and hence do not at all lend themselves to the production of thienylsodium compounds in commercial quantities.

It has now been discovered that halogenated thiophene compounds can be reacted with sodium under particular conditions hereinafter described in detail to yield a thienylsodium derivative. In accordance with the process of this invention thienylsodium compounds are prepared by reacting a halogenated thiophene with sodium at a temperature between about 50° C. and about 150° C. in the presence of an inert organic solvent. Preferably, the temperature at which the reaction takes place will be between about 60° C. and about 90° C. Under such conditions it has been found that a metathetical reaction takes place and the halogen atom of the halothiophene is replaced by sodium. The thiophene reactant to be employed in the present process may contain one or more alkyl substituents; it being essential, however, for purposes of the present invention, that the reactant contain at least one halogen substituent. The reaction contemplated by this invention may accordingly be designated by the following general equation:

where X represents a halogen atom and the remaining substituents are either hydrogen atoms or alkyl radicals.

It has been found that by carrying out the above reaction in an inert atmosphere and in the presence of an inert organic solvent, such as an ether, toluene, benzene, etc., or mixtures thereof, thienylsodium compounds can be readily prepared in considerably higher yields than have heretofore been obtained. Also, it is evident that thienylsodium, for instance, prepared from chlorothiophene is more easily accessible than thienylsodium synthesized according to previous procedures involving the use of organomercury compounds. Whereas the reaction difficulties and expense connected with the preparation of these latter compounds would prohibit the use of thienylsodium prepared in this manner on a commercial scale, the process of the present invention is applicable for the commercial manufacture of numerous thiophene products. Thus, the thienylsodium compounds of the present invention are extremely useful in the synthesis of various derivatives of thiophene which, in turn, find use in the manufacture of plastics, pharmaceuticals, insecticides, dyes, addition agents for petroleum fractions, odorants, synthetic lubricants, waxes, extreme pressure additives for mineral oils, and anti-foaming agents. The thienylsodium compounds produced in accordance with the method of this invention may be further subjected to sulfonation, carbonation, halogenation, acylation, alkylation, hydrogenation, nitration, etc., to yield useful derivatives of thiophene. The compounds may also be coupled or condensed with other molecules, be reacted with various other metals and, in general, undergo a multitude of reactions which will be recognized by those skilled in the art.

In carrying out the reaction of this invention, sodium may be introduced into the reaction mixture as metallic sodium or in the form of an alloy containing sodium in substantial proportion, preferably as its major component. A particularly effective means for introducing sodium into the reaction mixture is from a sodium amalgam. The use of a sodium amalgam has generally been found to give higher yields of the desired thienylsodium compound than the use of metallic sodium. This increased yield of product is due primarily to the fact that sodium in the form of an amalgam is in an extremely finely sub-divided state, presenting a very extensive reaction surface. In general, it may be stated that the reaction rate, and consequently the yield of desired product, is dependent on the particle size of the sodium. As a rule, the smaller the particle size of sodium used, the faster was the rate of reaction. Accordingly, finely divided sodium, such as sodium amalgam, sodium shot, or sodium sand, is to be preferred for use in the present process.

It is essential that the temperature at which the reaction of sodium and halogenated thiophene compounds is carried out in accordance with this invention be between about 50° C. and about 150° C. At temperatures below 50° C. no yield of the desired thineylsodium was obtained. Likewise, at a temperature above 150° C. substantially no reaction yielding thienylsodium was found to take place. The decrease in yield at the higher temperatures is undoubtedly due to the fusion of the sodium particles employed, since the yield is substantially lowered above the melting point of sodium and decreases with higher temperatures up to a limit of about 150° C. Accordingly, for purposes of the present invention the temperature limits of 50° C. and 150° C. are to be considered critical and the preferred temperature range is between about 60° C. and about 90° C. The reaction may, if desired, be carried out under pressure, although ordinarily the process proceeds readily at atmospheric pressure. Usually when a pressure is employed, it will be sufficient to maintain the reactants in the liquid phase, and this will be dependent on the particular temperature involved, said temperature necessarily being within the above stated limits.

Due to the high reactivity of sodium and the resultant thienylsodium compound, it is essential to exclude moisture and air from the reaction zone and to carry out the process of this invention in an inert atmosphere such as nitrogen or other of the inert gases. If the inert solvent employed is one of low boiling point, such as an ether, the vapor of said solvent may provide the inert atmosphere under which the reaction takes place.

After the reaction between the halogenated thiophene compound and sodium is finished, the thienylsodium compound which is formed thereby as a substance insoluble in benzene and the other inert organic solvents suitable for the process may be separated from the solution. However, for practical use of the thienylsodium compounds, it is unnecessary to separate the compounds from solution. It is advantageous to use the solution containing the thienylsodium compounds in suspended form immediately for performing further reactions. The thienylsodium compounds are of high reactivity and by bringing the thienylsodium compounds in contact with substances containing reactive groups or atoms, a large number of different thiophene derivatives can be obtained. Suitable substances for carrying out these reactions are, for example, alkyl halides, nitriles, acid anhydrides, carbon dioxide, sulfur dioxide, compounds containing reactive hydrogen atoms which are able to be replaced by alkali metal, and the like. For example, by introducing carbon dioxide into a benzene solution containing thienylsodium, yields of thiophenic acid approaching 85 per cent can be obtained. As a general rule, it is desirable in the present reaction to employ chlorothiophene compounds, since these are more readily obtainable than the other halothiophene compounds and also chlorothiophene compounds generally give a higher yield of the desired thienylsodium compound than do the other halothiophenes.

The following detailed examples will serve to illustrate the method of preparing thienylsodium compounds in accordance with the present invention.

Example 1

A mixture of 29.5 grams (0.25 mole) of 2-chlorothiophene and 200 milliliters of dry toluene was slowly added over a period of 2 hours, at a reflux temperature of 112° C., to 13.75 grams (0.60 gram atom) of molten sodium in 100 milliliters of toluene. The reaction was carried out in an atmosphere of nitrogen. The reaction mixture began to darken immediately and after the addition was completed, the mixture was refluxed for an additional hour, after which it was cooled to 25° C. in an ice bath. The product resulting from said reaction was identified as 2-thienylsodium.

Such identification was effected by carbonating the product by the addition thereto of freshly crushed Dry Ice. The temperature was kept below 30° C. Thirty milliliters of methanol were then added to destroy the unreacted sodium and then 200 milliliters of distilled water were cautiously added. The reaction mixture was then evaporated nearly to dryness and the residue acidified with 70 milliliters of concentrated hydrochloric acid. The resulting crystalline product was filtered and extracted with ethanol. The ethanol was then removed to yield a crystalline material weighing 10 grams (31 per cent yield) having a melting point of 125–126° C. and a neutral equivalent of 123.3. The calculated neutral equivalent for 2-thiophenecarboxylic acid was 128. The mixed melting point of this product with an authentic sample of 2-thiophenecarboxylic acid gave no depression.

Example 2

A mixture of 29.5 grams (0.25 mole) of 2-chlorothiophene and 100 milliliters of anhydrous dibutyl ether was slowly added over a period of one hour to sodium amalgam sand containing 9 grams (0.39 gram atom) of sodium and 6 grams (0.03 gram atom) of mercury in 100 milliliters of anhydrous dibutyl ether which had been warmed at a temperature of 50–55° C. After the addition was completed, the reaction mixture was stirred for an additional hour at the same temperature and then cooled to 25° C. The product resulting from said reaction was identified as 2-thienylsodium.

Such identification was effected by carbonating the product by the addition thereto of freshly crushed Dry Ice. Unreacted sodium was destroyed with 30 milliliters of ethanol, and then 150 milliliters of distilled water were cautiously added. The resulting aqueous layer was acidified with 70 milliliters of concentrated hydrochloric acid to yield a small amount of a crystalline product. The aqueous layer was then extracted with diethyl ether to remove the crystalline product therefrom. The ether was removed from said product by evaporation in a steam bath. The residue was dissolved in a minimum amount of hot water, decolorized with charcoal and quickly filtered. One gram of white needle-like crystals having a melting point of 125–126° C. was obtained. The mixed melting point of this material with an authentic sample of 2-thiophenecarboxylic acid gave no depression.

Example 3

A mixture of 119 grams (1.0 mole) of 2-chlorothiophene and 700 milliliters of benzene was slowly added over a period of 2 hours to sodium amalgam sand containing 35 grams (1.5 gram atoms) of sodium and 20 grams (0.1 gram atom) of mercury in 300 milliliters of benzene. The reaction mixture was warmed to 60–70° C. and after the addition was completed, the mixture was stirred for an additional 2 hours at the same temperature. The mixture was then cooled to 20° C. and the product resulting from said reaction was identified as 2-thienylsodium.

Such identification was effected by carbonating the product by the addition thereto of freshly crushed Dry Ice. As the carbonation proceeded, the temperature rose to 30° C. and then fell rapidly. Unreacted sodium was destroyed with 100 milliliters of ethanol, and 400 milliliters of distilled water were then added cautiously. Acidification of the resulting aqueous layer with 170 milliliters of concentrated hydrochloric acid yielded 75 grams (78 per cent yield) of 2-thiophenecarboxylic acid. A portion of this product was dissolved in a minimum amount of hot water, decolorized with charcoal and quickly filtered. A white crystalline product having a melting point of 125–126° C. was obtained. The mixed melting point of this product with an authentic sample of 2-thiophenecarboxylic acid gave no depression.

*Example 4*

A mixture of 29.5 grams (0.25 mole) of 2-chlorothiophene and 200 milliliters of anisole was added slowly over a period of one hour to sodium amalgam sand containing 9 grams (0.39 gram atom) of sodium and 6 grams (0.03 gram atom) of mercury in 100 milliliters of anisole. The reaction mixture was warmed to a temperature of 50–55° C. and after the addition was completed, the reaction mixture was stirred for an additional hour at the same temperature. The mixture was then cooled to 25° C. to yield a product which was identified as 2-thienylsodium.

Such identification was effected by carbonating the product with Dry Ice. The unreacted sodium was then destroyed by the addition of 30 milliliters of ethanol, and 150 milliliters of distilled water were cautiously added. Acidification of the resulting aqueous layer with 70 milliliters of concentrated hydrochloric acid yielded an oily layer. The resulting acidified solution was heated to near boiling and then quickly filtered. A crystalline product separated from the cooled filtrate. The product was dissolved in a small amount of hot water, decolorized with charcoal, filtered and cooled. White needle-like crystals having a melting point of 127° C. were obtained. The mixed melting point of this product with an authentic sample of 2-thiophenecarboxylic acid gave substantially no depression, establishing the product as 2-thiophenecarboxylic acid.

*Example 5*

A mixture of 118 grams (1.0 mole) of 2-chlorothiophene and 1000 milliliters of benzene was added rapidly to freshly prepared sodium amalgam sand containing 50 grams (2.17 gram atoms) of sodium and 29 grams (0.145 gram atom) of mercury. The reaction mixture was warmed to a reflux temperature of 82° C. for a period of 4 hours. The product resulting from said reaction was identified as 2-thienylsodium.

Such identification was effected by cooling the product to 10° C. and carbonated by the addition of small pieces of freshly crushed Dry Ice. The unreacted sodium was then destroyed by the addition of 100 milliliters of ethanol, after which 350 milliliters of distilled water were cautiously added. Acidification of the resulting aqueous layer with 125 milliliters of concentrated hydrochloric acid yielded 108 grams (84 per cent yield) of a product which was identified as 2-thiophenecarboxylic acid.

*Example 6*

A mixture of 118 grams (1.0 mole) of 2-chlorothiophene and 250 milliliters of benzene was added rapidly to freshly prepared sodium amalgam sand containing 50 grams (2.17 gram atoms) of sodium and 29 grams (0.145 gram atom) of mercury. The reaction mixture was warmed to a reflux temperature of 82° C. for a period of 4 hours. The product resulting from said reaction was identified as 2-thienylsodium.

Such identification was effected by cooling the product to 10° C. and carbonated by the addition of small pieces of freshly crushed Dry Ice. The unreacted sodium was then destroyed by the addition of 100 milliliters of ethanol, after which 350 milliliters of distilled water were cautiously added. Acidification of the resulting aqueous layer with 125 milliliters of concentrated hydrochloric acid yielded 87 grams (70 per cent yield) of a product which was identified as 2-thiophenecarboxylic acid.

*Example 7*

A mixture of 118 grams (1.0 mole) of 2-chlorothiophene and 100 milliliters of benzene was added rapidly to freshly prepared sodium amalgam sand containing 50 grams (2.17 gram atoms) of sodium and 29 grams (0.145 gram atom) of mercury. The reaction mixture was warmed to a reflux temperature of 82° C. for a period of 4 hours. The product resulting from said reaction was identified as 2-thienylsodium.

Such identification was effected by cooling the product to 10° C. and carbonated by the addition of small pieces of freshly crushed Dry Ice. The unreacted sodium was then destroyed by the addition of 100 milliliters of ethanol, after which 350 milliliters of distilled water were cautiously added. Acidification of the resulting aqueous layer with 125 milliliters of concentrated hydrochloric acid yielded 25 grams (20 per cent yield) of a product which was identified as 2-thiophenecarboxylic acid.

An examination of the yields of 2-thiophenecarboxylic acid obtained in Examples 5, 6, and 7, where the reaction was carried out under substantially identical conditions with the exception of the amount of solvent employed, shows that the quantity of solvent present directly affects the yield of acid obtained, which, in turn, is indicative of the amount of desired thienylsodium compound obtained. This phenomenon will be readily apparent from the following table:

| Example | Ml. of Solvent per Mole of 2-Chlorothiophene | Per cent Yield of 2-Thiophenecarboxylic Acid |
|---|---|---|
| 5 | 1,000 | 84 |
| 6 | 250 | 70 |
| 7 | 100 | 20 |

A plot of the yields of thiophenecarboxylic acid against the amount of solvent employed in the reaction gives a smooth curve, as shown in the attached drawing. It will be seen from an examination of this curve that the yield of 2-thiophenecarboxylic acid rapidly increases as the quantity of solvent is increased up to about 700 milliliters of solvent per mole of 2-chlorothiophene present. The yield of acid upon further increase in the amount of solvent then remains substantially unchanged, other conditions remaining constant. While the further increases in quantity of solvent used appear to have no detrimental effect on the reaction, generally the amounts of solvent employed will not exceed about 1000 milliliters per mole of halogenated thiophene being treated. For most economical operation of the process of this invention under the preferred temperature conditions of 60° C. to 90° C., the amount of solvent present will usually be greater than 200 milliliters per mole of halogenated thiophene and preferably between about 200 and about 700 milliliters per mole of halogenated thiophene.

I claim:

1. A process for preparing a thienylsodium compound comprising contacting sodium in the presence of an inert organic solvent with a compound having the general formula:

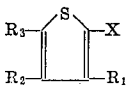

where X is a halogen atom and substituents $R_1$, $R_2$, and $R_3$ are selected from the group consisting of alkyl radicals and hydrogen atoms, maintaining the resulting reaction mixture under an inert atmosphere and at a temperature between about 50° C. and about 150° C., thereby effecting replacement of the halogen substituent of said compound with sodium.

2. A process for preparing a thienylsodium compound comprising contacting sodium in the presence of an inert organic solvent with a compound having the general formula:

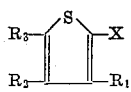

where X is a halogen atom and substituents $R_1$, $R_2$, and $R_3$ are selected from the group consisting of alkyl radicals and hydrogen atoms, maintaining the resulting reaction mixture under an inert atmosphere and at a temperature between about 60° C. and about 90° C., thereby effecting replacement of the halogen substituent of said compound with sodium.

3. A process for preparing a thienylsodium compound comprising contacting sodium in the presence of an inert organic solvent with a compound having the general formula:

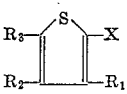

where X is a chlorine atom and substituents $R_1$, $R_2$, and $R_3$ are selected from the group consisting of alkyl radicals and hydrogen atoms, maintaining the resulting reaction mixture under an inert atmosphere and at a temperature between about 50° C. and about 150° C., thereby effecting replacement of the chlorine substituent of said compound with sodium.

4. A process for preparing a thienylsodium compound comprising contacting sodium in the presence of benzene with a compound having the general formula:

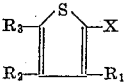

where X is a halogen atom and substituents $R_1$, $R_2$, and $R_3$ are selected from the group consisting of alkyl radicals and hydrogen atoms, maintaining the resulting reaction mixture under an inert atmosphere and at a temperature between about 50° C. and about 150° C., thereby effecting replacement of the halogen substituent of said compound with sodium.

5. A process for preparing a thienylsodium compound comprising contacting sodium in the presence of toluene with a compound having the general formula:

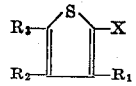

where X is a halogen atom and substituents $R_1$, $R_2$, and $R_3$ are selected from the group consisting of alkyl radicals and hydrogen atoms, maintaining the resulting reaction mixture under an inert atmosphere and at a temperature between about 50° C. and about 150° C., thereby effecting replacement of the halogen substituent of said compound with sodium.

6. A process for preparing a thienylsodium compound comprising contacting sodium with a compound having the general formula:

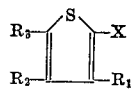

where X is a halogen atom and substituents $R_1$, $R_2$, and $R_3$ are selected from the group consisting of alkyl radicals and hydrogen atoms in the presence of at least 200 milliliters of an inert organic solvent per mole of said compound, maintaining the resulting reaction mixture under an inert atmosphere and at a temperature between about 50° C. and about 150° C., thereby effecting replacement of the halogen substituent of said compound with sodium.

7. A process for preparing a thienylsodium compound comprising contacting sodium with a compound having the general formula:

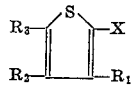

where X is a halogen atom and substituents $R_1$, $R_2$, and $R_3$ are selected from the group consisting of alkyl radicals and hydrogen atoms in the presence of between about 200 and about 700 milliliters of benzene per mole of said compound, maintaining the resulting reaction mixture under an inert atmosphere and at a temperature between about 60° C. and about 90° C., thereby effecting replacement of the halogen substituent of said compound with sodium.

8. A process which comprises reacting sodium in the presence of an inert organic solvent with a monohalogenated thiophene at a temperature between about 50° C. and about 150° C. thereby effecting replacement of the halogen substituent of said thiophene reactant with sodium to yield a thienylsodium compound.

9. A process which comprises reacting sodium in the presence of an inert organic solvent with a monohalogenated thiophene at a temperature between about 60° C. and about 90° C. thereby effecting replacement of the halogen substituent of said thiophene reactant with sodium to yield a thienylsodium compound.

10. A process which comprises reacting sodium in the presence of an inert organic solvent with chlorothiophene at a temperature between about 50° C. and about 150° C. thereby effecting replacement of the chloro substituent of said thiophene reactant with sodium to yield a resulting compound of thienylsodium.

11. A process which comprises reacting sodium in the presence of an inert organic solvent with chlorothiophene at a temperature between about 60° C. and about 90° C. thereby effecting replacement of the chloro substituent of said thiophene reactant with sodium to yield a resulting compound of thienylsodium.

12. A process which comprises reacting sodium in the presence of benzene with a monohalogenated thiophene at a temperature between about 50° C. and about 90° C. thereby effecting replacement of the halogen substituent of said thiophene reactant with sodium to yield a thienylsodium compound.

13. A process which comprises reacting sodium in the presence of benzene with chlorothiophene at a temperature between about 60° C. and about 90° C. thereby effecting replacement of the chloro substituent of said thiophene reactant with sodium to yield a resulting compound of thienylsodium.

14. A process which comprises reacting sodium with a monohalogenated thiophene at a temperature between about 50° C. and about 150° C. in the presence of at least about 200 milliliters of an inert organic solvent per mole of said monohalogenated thiophene thereby effecting replacement of the halogen substituent of said thiophene reactant with sodium to yield a thienylsodium compound.

15. A process which comprises reacting sodium with chlorothiophene at a temperature between about 60° C. and about 90° C. in the presence of between about 200 and about 700 milliliters of benzene per mole of chlorothiophene thereby effecting replacement of the chloro substituent of said thiophene reactant with sodium to yield a resulting compound of thienylsodium.

16. A process which comprises reacting a sodium amalgam in the presence of an inert organic solvent with a monohalogenated thiophene at a temperature between about 50° C. and about 150° C. thereby effecting replacement of the halogen substituent of said thiophene reactant with sodium to yield a thienylsodium compound.

17. A process which comprises reacting a sodium amalgam in the presence of an inert organic solvent with chlorothiophene at a temperature between about 50° C. and about 150° C. thereby effecting replacement of the chloro substituent of said thiophene reactant with sodium to yield a resulting compound of thienylsodium.

JOHN W. SCHICK.

REFERENCES CITED

The following references are of record in the file of this patent:

UNITED STATES PATENTS

| Number | Name | Date |
| --- | --- | --- |
| 2,163,846 | Morton | June 27, 1939 |

OTHER REFERENCES

Richter "Organic Chemistry," pages 649–650, Wiley, N. Y., 1938.

Tohl and Eberhard, Ber. 26, 2947 (1893).